April 19, 1932.  C. PAULSON  1,854,760

APPARATUS FOR GAUGING MATERIAL

Filed Oct. 29, 1927

Inventor
Christian Paulson
by *H. A. Patterson* Att'y

Patented Apr. 19, 1932

1,854,760

UNITED STATES PATENT OFFICE

CHRISTIAN PAULSON, OF CHICAGO, ILLINOIS, ASSIGNOR TO WESTERN ELECTRIC COMPANY, INCORPORATED, OF NEW YORK, N. Y., A CORPORATION OF NEW YORK

APPARATUS FOR GAUGING MATERIAL

Application filed October 29, 1927. Serial No. 229,723.

This invention relates to an apparatus for gauging material, and more particularly to a method of and apparatus for determining thickness or surface characteristics of material by means of a reflected light beam.

In the inspection or checking of materials for size or surface configurations, great care is necessary in adjusting the measuring instruments commonly employed for that purpose and considerable time is required in taking the measurements. Thus, for example, in the manufacture of telephonic equipment many parts must be held to a precision within one ten-thousandth of an inch. The necessity of this high precision in the large production of parts requires skill and the expenditure of considerable time in the accurate inspection of the parts.

The object of this invention is to provide an apparatus for accurately inspecting material.

In accordance with one embodiment of this invention, an apparatus is provided for gauging materials such as solid objects, which consists of a concave mirror mounted upon three equally spaced gauge legs, one resting on the material under test and the other two resting on a standard or master surface, so adapted that the angle of the mirror changes in response to variations in the material and reflects a beam of light to a photoelectric cell where the result is indicated by the actuation of a signal.

Figure 1:
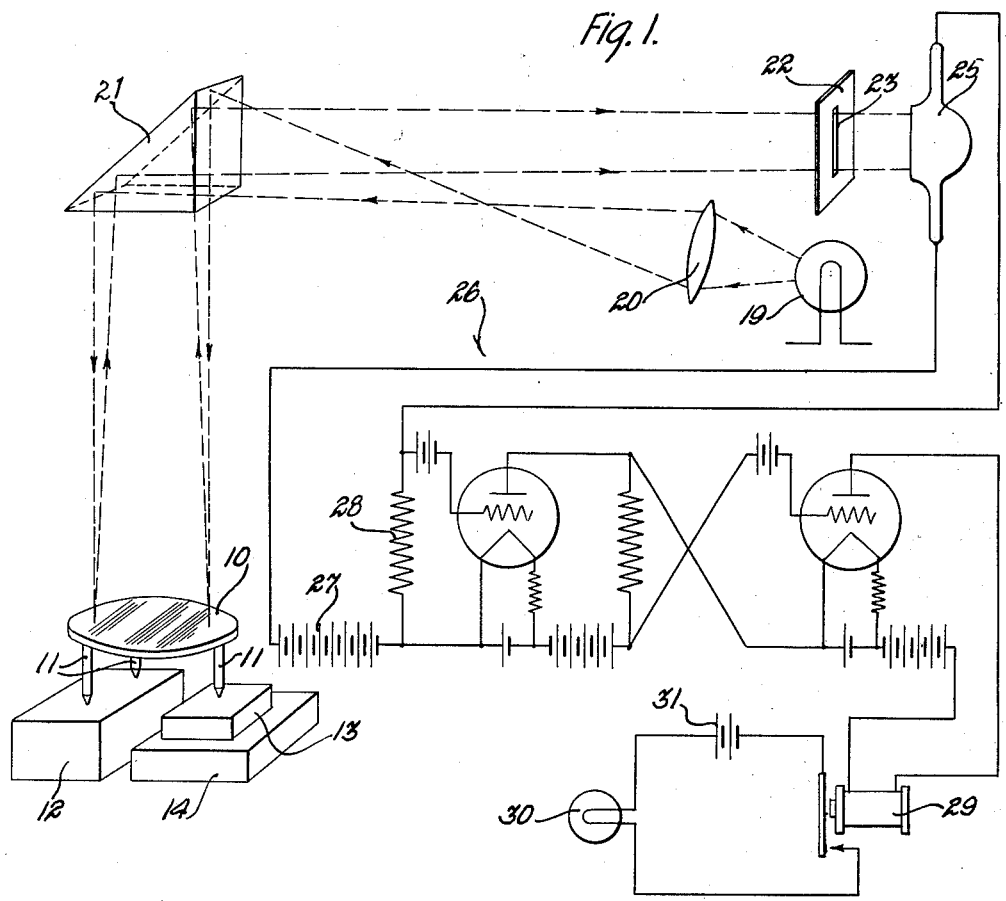
Figure 2:
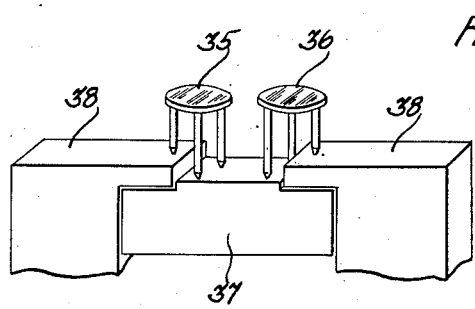

These and other objects will be apparent from the following detailed description taken in connection with the accompanying drawings, wherein Fig. 1 is a perspective view of a concave mirror resting upon a master surface and the material under test, and a diagrammatic illustration of a photoelectric cell connected to an amplifier for actuating a signal, and Fig. 2 is a fragmentary perspective view showing the use of two mirrors for determining the surface characteristics of a material.

Referring now to the drawings wherein like numerals refer to similar parts throughout the various views, the numeral 10 designates a concave mirror supported by three equally spaced gauge legs 11 resting upon a master surface 12 and upon a part 13, the thickness or surface configuration of which is to be determined. The part 13 rests upon another master surface 14. A source of light 19 is adapted to direct its rays through a suitable condensing lens 20 to a right angle prism 21 where the light rays are reflected to the concave mirror 10. Depending on the thickness of the part the mirror reflects the light beam through an angle back to the prism 21 from where the light is reflected to a light shield 22. The light shield has an aperture 23 of such dimensions that it will cut off the reflected light from a light sensitive device of any suitable character, such as a photoelectric cell 25, when the variation of the part 13 under test is more or less than a predetermined value with reference to the gauge point or leg 11 resting upon the part 13. If the thickness of the material is within the permissible variation the light passes through the aperture 22 and energizes the photoelectric cell 25. The terminals of the photoelectric cell are connected in the input circuit of a two stage amplifier 26. A battery 27 is placed in circuit with the photoelectric cell, and when the light enters the cell a current is caused to flow through a resistance 28 to change the potential on the input circuit of the amplifier 26. The output side of the amplifier 26 is connected to a relay 29 which is adapted to close a circuit having a lamp 30 and a battery 31 to light the lamp.

Fig. 2 discloses the use of two concave mirrors 35 and 36 for testing the surface characteristics of a part 37 under test with reference to master surfaces 38. Any desired number of mirrors may be used with one photoelectric cell and one right angle prism in a method similar to that illustrated in Fig. 1. In the use of more than one mirror, the several mirrors are adapted to focus and reflect their beams of light received from the common light source to the right angle prism where the light beams are reflected and superimposed upon each other in the light sensitive cell. The greater intensity of light causes an increased current to flow in the input of the amplifier circuit and thus the output of the amplifier is greatly multiplied. The apparatus is adjusted with a standard part so that when the surface under test is within predetermined limits the light reflected from the mirrors through the aperture in the light shield is of sufficient intensity to operate the signal. If a portion of the surface is high or low the mirror over that particular portion will reflect the light away from the aperture in the light shield and the signal will not be actuated because the amount of light entering the cell is of insufficient intensity. The use of the multiple mirrors increases the number of points of contact with the surface under test and thus permits a very thorough and minute inspection of a part being inspected.

From the foregoing description it will be readily apparent that the inventon is particularly applicable in connection with gauging successively a large number of like parts. In the operation of the apparatus the master surfaces and the aperture in the light shield are first adjusted so as to prepare the apparatus to be used in gauging parts within a predetermined range. The device is made selective by making the aperture in the light shield of such dimensions that it will cut off the reflected light from the photoelectric cell when the variation of the surface under test is more or less than a predetermined value; that is, a change in the angle of the reflecting mirror causes a change in the angle of reflection of the beam of light, so that if the part under inspection is not within the predetermined limits only a part of the beam of light passes through the aperture or the beam is totally screened from the photoelectric cell by the light shield. Subsequent to this adjustment the operator places the part upon a master surface under the gauge point or leg of the mirror. If the part under test is within the permissible limits the light rays energize the photoelectric cell. The current caused to flow by the beam of light entering the photoelectric cell is amplified many times by the amplifier circuit to operate a relay which closes an electrical circuit and illuminates a lamp. The illumination of this lamp notifies the operator that the part is within the prescribed limits and is satisfactory.

What is claimed is:

1. In an apparatus for gauging dimensions of a solid object by comparison with a standard, a reflecting mirror having three supporting contact points for contact with the object to be gauged and with the standard of comparison in combination with means to magnify angular displacement of the mirror occasioned by dimensional differences between the object and the standard and means to signal displacement of the mirror beyond a predetermined amount.

2. In an apparatus for gauging material, a plurality of reflecting elements, means for casting a beam of light on one of the elements, means for engaging the material for effecting movement of one of said reflecting elements relative to the other in accordance with variations in the material under test for causing a deflection of the reflection of the beam of light between the reflecting elements, and means controlled by the beam of light for indicating a predetermined variation in the position of one of the reflecting elements.

3. In an apparatus for gauging material, a movable reflecting element, a fixed reflecting element, means for casting a beam of light on one of said elements and reflecting the beam on the other element, means for supporting the movable reflecting element in varying positions controlled by the material under test, and means controlled by the beam of light for indicating a predetermined variation in the angular position of the movable reflecting element.

In witness whereof, I hereunto subscribe my name this 20 day of October, A. D., 1927.

CHRISTIAN PAULSON.